(12) United States Patent
Li et al.

(10) Patent No.: US 12,055,402 B2
(45) Date of Patent: Aug. 6, 2024

(54) METHOD AND SYSTEM FOR PATH PLANNING, COMPUTER SYSTEM, AND COMPUTER-READABLE STORAGE MEDIUM

(71) Applicant: BEIJING JINGDONG ZHENSHI INFORMATION TECHNOLOGY CO., LTD., Beijing (CN)

(72) Inventors: Jianqi Li, Beijing (CN); Yuanhui Lang, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 644 days.

(21) Appl. No.: 17/276,729

(22) PCT Filed: Jul. 19, 2019

(86) PCT No.: PCT/CN2019/096720
§ 371 (c)(1),
(2) Date: Mar. 16, 2021

(87) PCT Pub. No.: WO2020/063064
PCT Pub. Date: Apr. 2, 2020

(65) Prior Publication Data
US 2022/0034675 A1      Feb. 3, 2022

(30) Foreign Application Priority Data
Sep. 30, 2018   (CN) .......................... 201811156309.4

(51) Int. Cl.
*G01C 21/34* (2006.01)
*G05D 1/00* (2006.01)
*G06F 18/23* (2023.01)

(52) U.S. Cl.
CPC ....... *G01C 21/3492* (2013.01); *G05D 1/0287* (2013.01); *G06F 18/23* (2023.01)

(58) Field of Classification Search
CPC .... G06F 18/23; G01C 21/3492; G05D 1/0287
See application file for complete search history.

(56) References Cited

U.S. PATENT DOCUMENTS 8,473,127 B2* 6/2013 Daum ................. B61L 15/0072
   701/19
2005/0252596 A1* 11/2005 Olsen ...................... B07C 7/005
   156/64

(Continued)

FOREIGN PATENT DOCUMENTS

| CN | 102929279 | 2/2013 |
| CN | 2013/166093 | 11/2013 |

(Continued)

OTHER PUBLICATIONS

Chinese Office Action, issued in the corresponding Chinese Patent Application No. 201811156309.4, dated May 7, 2022, 18 pages (including machine translation).

(Continued)

*Primary Examiner* — Andrea C Leggett
(74) *Attorney, Agent, or Firm* — HSML P.C.

(57) ABSTRACT

The present disclosure provides a method for path planning, comprising: determining moving paths for a plurality of sorting vehicles (S210), wherein each sorting vehicle corresponds to one of the moving paths, and each moving path comprises one or more navigation points; in a process of each sorting vehicle moving along the corresponding moving path, determining whether the moving paths for the plurality of sorting vehicles have a conflict point (S220), wherein the conflict point is a navigation point causing distribution congestion; in response to the moving paths for the plurality of sorting vehicles have a conflict point, deter- (Continued)

mining a distribution congestion area according to position information of the conflict point (S230); and planning a moving path for the sorting vehicle outside the distribution congestion area (S240). The present disclosure further provides a system for path planning, a computer system and a computer-readable storage medium.

14 Claims, 7 Drawing Sheets

(56) References Cited

U.S. PATENT DOCUMENTS

2019/0265703 A1* 8/2019 Hicok ............... G05D 1/0088
2020/0365015 A1* 11/2020 Nguyen ............. G08G 1/0129

FOREIGN PATENT DOCUMENTS

| | | |
|---|---|---|
| CN | 105261217 | 1/2016 |
| CN | 106647734 | 5/2017 |
| CN | 106681324 | 5/2017 |
| CN | 106920417 | 7/2017 |
| CN | 107272698 | 10/2017 |
| CN | 107703943 | 2/2018 |
| CN | 108268016 | 7/2018 |
| WO | 2013/166093 | 11/2013 |

OTHER PUBLICATIONS

International Search Report and Written Opinion, issued in the corresponding PCT application No. PCT/CN2019/096720, dated Oct. 23, 2019, 9 pages.

* cited by examiner

METHOD AND SYSTEM FOR PATH PLANNING, COMPUTER SYSTEM, AND COMPUTER-READABLE STORAGE MEDIUM

CROSS-REFERENCE TO RELATED APPLICATION(S)

This application is a Section 371 National Stage Application of International Application No. PCT/CN2019/096720, filed on Jul. 19, 2019, entitled "METHOD AND SYSTEM FOR PATH PLANNING, COMPUTER SYSTEM, AND COMPUTER-READABLE STORAGE MEDIUM", which claims priority to Chinese Patent Application No. 201811156309.4, filed on Sep. 30, 2018, which are incorporated herein by reference in their entirety.

TECHNICAL FIELD

The present disclosure relates to a technical field of warehousing logistics, and more specifically, to a method and system for path planning, a computer system and a computer-readable storage medium.

BACKGROUND

With a rapid development of automatic control, communication and computer technology, sorting vehicles are increasingly used in many fields such as industrial and agricultural production, architecture, logistics, and daily life. Since application environment and functions to be implemented are becoming more and more complex, a plurality of sorting vehicles may cause congestion in a process of the plurality of sorting vehicles performing distribution.

It is difficult to effectively plan a moving path for a sorting vehicle by using the related technology, resulting in serious congestion during distribution and reducing distribution efficiency.

SUMMARY

The present disclosure provides a method and system for path planning, a computer system and a computer-readable storage medium.

One aspect of the present disclosure provides a method for path planning, comprising: determining moving paths for a plurality of sorting vehicles, wherein each sorting vehicle corresponds to one of the moving paths, and each moving path comprises one or more navigation points; in a process of each sorting vehicle moving along a corresponding moving path, determining whether the moving paths for the plurality of sorting vehicles have a conflict point, wherein the conflict point is a navigation point causing distribution congestion; in response to the moving paths for the plurality of sorting vehicles have a conflict point, determining a distribution congestion area according to position information of the conflict point; and planning a moving path for a sorting vehicle outside the distribution congestion area.

According to an embodiment of the present disclosure, the moving paths for the plurality of sorting vehicles have a plurality of conflict points, and the determining a distribution congestion area according to position information of the conflict point comprises: performing cluster analysis on the plurality of conflict points according to position information of each conflict point; and determining the distribution congestion area according to a result of the cluster analysis.

According to an embodiment of the present disclosure, the determining the distribution congestion area according to a result of the cluster analysis comprises: determining a plurality of distribution congestion areas according to the result of the cluster analysis; in response to a plurality of distribution congestion areas are determined, the planning a moving path for a sorting vehicle outside the distribution congestion area comprises: determining a number of conflict points within each of the plurality of distribution congestion areas; determining a congestion cost for each distribution congestion area according to the number of conflict points within said each distribution congestion area; and planning the moving path for the sorting vehicle outside the distribution congestion areas according to the congestion cost for each distribution congestion area.

According to an embodiment of the present disclosure, the planning the moving path for the sorting vehicle outside the distribution congestion areas according to the congestion cost for each distribution congestion area comprises: comparing the congestion cost for each of the distribution congestion areas with the congestion cost for another of the distribution congestion areas; and planning the moving path for the sorting vehicle outside the distribution congestion areas according to a position of a distribution congestion area having the lowest congestion cost.

According to an embodiment of the present disclosure, the method further comprises: re-planning a moving path for each sorting vehicle within the distribution congestion area.

Another aspect of the present disclosure provides a system for path planning, comprising a first determining module, configured to determine moving paths for a plurality of sorting vehicles, wherein each sorting vehicle corresponds one of the moving paths, and each moving path comprises one or more navigation points; a judging module, configured to in a process of each sorting vehicle moving along the corresponding moving path, determine whether the moving paths for the plurality of sorting vehicles have a conflict point, wherein the conflict point is a navigation point causing distribution congestion; a second determining module, configured to in response to the moving paths for the plurality of sorting vehicles have a conflict point, determine a distribution congestion area according to position information of the conflict point; and a planning module, configured to plan a moving path for a sorting vehicle outside the distribution congestion area.

According to an embodiment of the present disclosure, the moving paths for the plurality of sorting vehicles have a plurality of conflict points, and the second determining module comprises: an analyzing unit, configured to perform cluster analysis on the plurality of conflict points according to position information of each conflict point; and a first determining unit, configured to determine the distribution congestion area according to a result of the cluster analysis.

According to an embodiment of the present disclosure, wherein: the first determining unit is configured to determine a plurality of distribution congestion areas according to the result of the cluster analysis; the planning module comprises: a second determining unit, configured to in response to a plurality of distribution congestion areas are determined, determine a number of conflict points within each of the plurality of distribution congestion areas; a third determining unit, configured to determine a congestion cost for each distribution congestion area according to the number of conflict points within said each distribution congestion area; and a planning unit, configured to plan the moving path for the sorting vehicle outside the distribution congestion areas according to the congestion cost for each distribution congestion area.

According to an embodiment of the present disclosure, the planning unit comprises: a comparing subunit, configured to compare the congestion cost for each of the distribution congestion areas with the congestion cost for another of the distribution congestion areas; and a planning subunit, configured to plan the moving path for the sorting vehicle outside the distribution congestion areas according to a position of a distribution congestion area having the lowest congestion cost.

According to an embodiment of the present disclosure, the planning module is further configured to re-plan a moving path for each sorting vehicle within the distribution congestion area.

Another aspect of the present disclosure provides a computer system, comprising: one or more processors; and a memory, configured to store one or more programs which, when executed by the one or more processors, cause the one or more processors to implement the method for path planning described above.

Another aspect of the present disclosure provides a computer-readable storage medium having executable instructions stored thereon which, when executed by a processor, cause the processor to implement the method for path planning described above.

BRIEF DESCRIPTION OF THE ACCOMPANYING DRAWINGS

The above and other objects, features, and advantages of the present disclosure will be more apparent through the following description of embodiments of the present disclosure with reference to the accompanying drawings, in which.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may further be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C). Those skilled in the art should further understand that essentially any transitional conjunctions and/or phrases representing two or more optional items, whether in the description, claims or drawings, should be understood to comprise the possibilities of one of these items, any of these items, or two items. For example, the phrase "A or B" should be understood to comprise the possibilities of "A" or "B", or "A and B."

The embodiments of the present disclosure provide a method and system for path planning. The method includes determining moving paths for a plurality of sorting vehicles, wherein each sorting vehicle corresponds to one of the moving paths, and each moving path comprises one or more navigation points; in a process of each sorting vehicle moving along a corresponding moving path, determining whether the moving paths for the plurality of sorting vehicles have a conflict point, wherein the conflict point is a navigation point causing distribution congestion; in response to the moving paths for the plurality of sorting vehicles have a conflict point, determining a distribution congestion area according to position information of the conflict point; and planning a moving path for a sorting vehicle outside the distribution congestion area.

Figure 1:
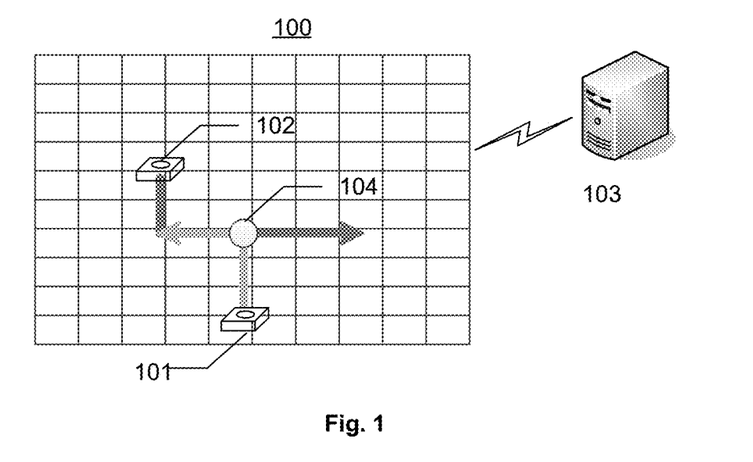
FIG. 1 schematically shows an exemplary system architecture to which a method and system for path planning may be applied according to an embodiment of the present disclosure.

FIG. 1 schematically shows an exemplary system architecture to which a method and system for path planning may be applied according to an embodiment of the present disclosure. It should be noted that FIG. 1 is only an example of a system architecture in which the embodiments of the present disclosure may be applied, so as to help those skilled in the art to understand the technical content of the present disclosure. It does not mean that the embodiments of the present disclosure cannot be used for other apparatuses, systems or scenes.

As shown in FIG. 1, a system architecture 100 according to the embodiment may include sorting vehicles 101 and 102 and a server 103. A medium of communication link may be provided between the sorting vehicles 101, 102 and the server 103, and providing the medium of communication link may include, for example, various connection types, such as wired and/or wireless communication links.

The server 103 may interact with the sorting vehicles 101 and 102 by using a network to receive or transmit messages, etc.

The server 103 may be a server providing various control services, for example, a background management server providing support for a moving path for the sorting vehicles 101 and 102 (just as an example). The background management server may analyze and process a received request for path planning and other data, and feedback a processing result (for example, information of a re-planned path, or data, etc.) to the sorting vehicles 101 and 102.

According to an embodiment of the present disclosure, the sorting vehicle 101 and the sorting vehicle 102 respectively have a corresponding moving path, and each moving path includes one or more navigation points. An intersection of lines in FIG. 1 may be used as a kind of the navigation points. 104 shown in FIG. 1 is a conflict point, and the conflict point 104 is a navigation point causing distribution congestion of the sorting vehicle 101 and the sorting vehicle 102.

It should be noted that the method for path planning provided by the embodiments of the present disclosure may generally be performed by the server 103. Correspondingly, the system for path planning provided by the embodiments of the present disclosure may generally be set in the server 103. The method for path planning provided by the embodiments of the present disclosure may further be performed by a server or a server cluster different from the server 103 and capable of communicating with the sorting vehicles 101 and 102 and/or the server 103. Correspondingly, the system for path planning provided by the embodiments of the present disclosure may further be set in a server or a server cluster different from the server 103 and capable of communicating with the sorting vehicles 101 and 102 and/or the server 103. Alternatively, the method for path planning provided by the embodiments of the present disclosure may further be performed by the sorting vehicles 101 and 102, or may further be performed by other terminal apparatuses different from the sorting vehicles 101 and 102. Correspondingly, the system for path planning provided by the embodiments of the present disclosure may further be set in the sorting vehicles 101 and 102, or in other terminal devices different from the sorting vehicles 101 and 102.

It should be understood that the numbers of sorting vehicles, network and server in FIG. 1 are merely illustrative. According to implementation demands, there may be any number of sorting vehicles, networks and servers.

Figure 2:
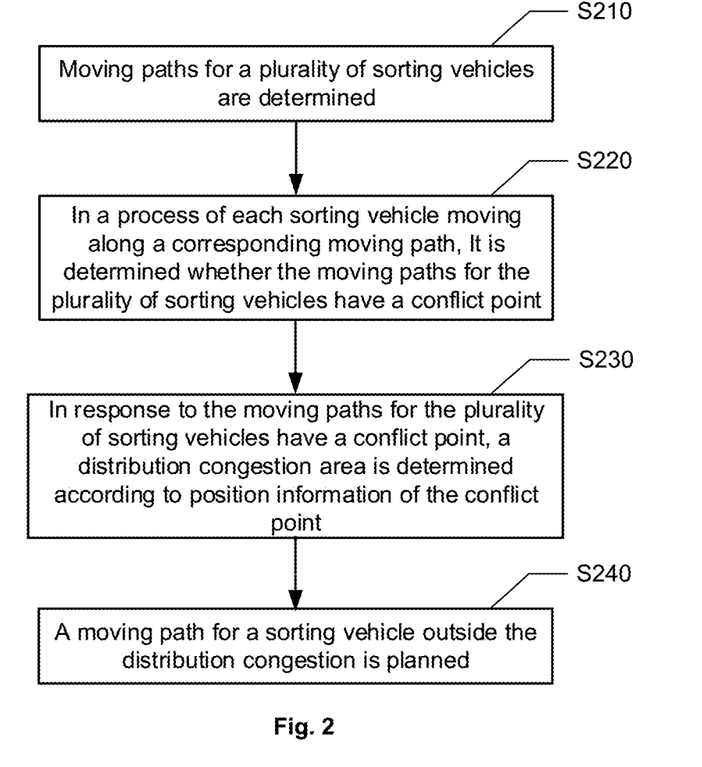
FIG. 2 schematically shows a flowchart of a method for path planning according to an embodiment of the present disclosure.

FIG. 2 schematically shows a flowchart of a method for path planning according to an embodiment of the present disclosure.

As shown in FIG. 2, the method includes operations S210 to S240.

In operation S210, moving paths for a plurality of sorting vehicles are determined, wherein each sorting vehicle corresponds to one of the moving paths, and each moving path includes one or more navigation points.

According to an embodiment of the present disclosure, the moving path for each sorting vehicle may be automatically generated according to an existing map and a destination to reach, and each sorting vehicle has a corresponding moving path.

Figure 3:
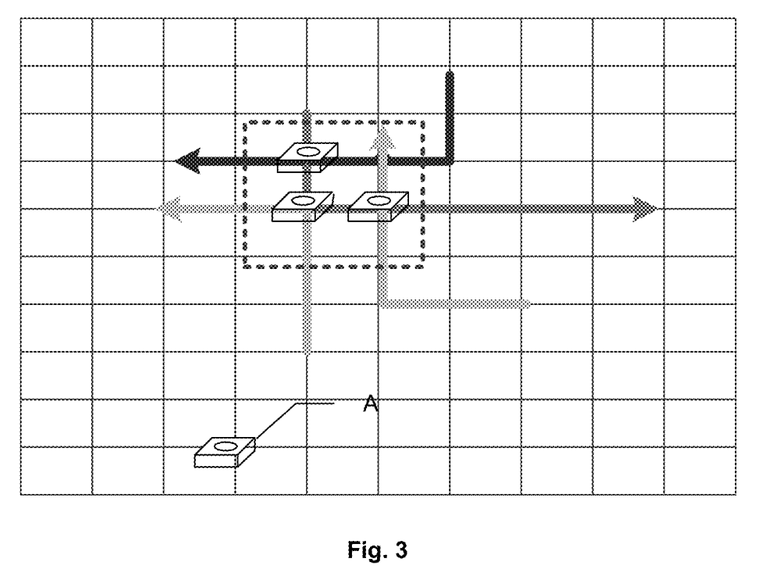
FIG. 3 schematically shows a diagram of sorting vehicles in a moving process according to an embodiment of the present disclosure.

FIG. 3 schematically shows a diagram of sorting vehicles in a moving process according to an embodiment of the present disclosure.

As shown in FIG. 3, four sorting vehicles are moving along their moving paths respectively in an actual distribution process.

In operation S220, in a process of each sorting vehicle moving according to the corresponding moving path, it is determined whether the moving paths for the plurality of sorting vehicles have a conflict point, wherein the conflict point is a navigation point causing distribution congestion.

According to an embodiment of the present disclosure, in a process of moving along the corresponding moving path, each sorting vehicle may determine whether a navigation point causing distribution congestion exists or not. It should be noted that different sorting vehicles have to lock navigation points before moving, so that the locked navigation points should not be planed for other sorting vehicles may better not plan. In a process of different sorting vehicles moving along their moving paths, the previously locked navigation points which have been passed by will be released. In view of this, it is determined whether a navigation point causing distribution congestion exists or not in a process of a sorting vehicle moving along a moving path.

For example, the sorting vehicle 102 in FIG. 1 locks eight navigation points on a path, including the navigation point 104. In locking of points by the sorting vehicle 101 according to a path, three points are locked successfully. If it is attempted to lock the navigation point 104, conflict of the locked points may occurs. At this time, if the sorting vehicle 102 has passed the navigation point 104, the sorting vehicle 102 would release the previously locked navigation point 104 which has been passed by, such that the sorting vehicle 101 may lock the navigation point 104 again.

In operation S230, in response to the moving paths for the plurality of sorting vehicles have a conflict point, a distribution congestion area is determined according to position information of the conflict point.

As shown in FIG. 3, there are conflict points in distribution paths for three sorting vehicles. A distribution congestion area may be determined according to position information of the conflict points, such as a congestion area shown by dotted lines in FIG. 3.

In operation S240, a moving path is planned for a sorting vehicle outside the distribution congestion area.

For example, as shown in FIG. 3, a sorting vehicle A is still moving outside the congestion area, and a remaining path for the sorting vehicle A outside the distribution area may be re-planned according to the distribution congestion area.

According to an embodiment of the present disclosure, it is also possible to re-plan a moving path for each sorting vehicle within the distribution congestion area. According to the embodiment of the present disclosure, by optimizing the moving path for each sorting vehicle within the distribution congestion area, distribution efficiency may be improved.

According to an embodiment of the present disclosure, by determining whether the moving paths for the plurality of sorting vehicles have a conflict point, a determining a distribution congestion area according to position information of the conflict point in response to the moving paths for the plurality of sorting vehicles have a conflict point, and planning a moving path for a sorting vehicle outside the distribution congestion area, it is possible to at least keep the sorting vehicles outside the distribution congestion area away from the congestion area. A moving path of sorting vehicle may be continuously optimized during the moving of the sorting vehicle in practice, such that the sorting vehicle may be adaptable to varying working environment. Therefore, it is possible to at least partially solve a technical problem of serious congestion in distribution and low distribution efficiency due to the difficulty in effectively planning a moving path for a sorting vehicle in related art, and achieve a technical effect of identifying the congestion and preventing the congestion from being increased.

The method shown in FIG. 2 may be further described with reference to FIG. 4 to FIG. 9 in combination with specific embodiments.

Figure 4:
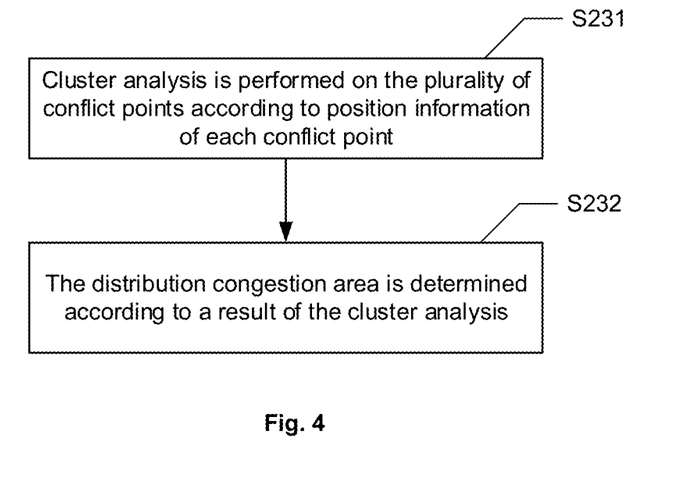
FIG. 4 schematically shows a flowchart of determining a distribution congestion area according to position information of a conflict point according to an embodiment of the present disclosure.

FIG. 4 schematically shows a flowchart of determining a distribution congestion area according to position information of a conflict point according to an embodiment of the present disclosure.

According to an embodiment of the present disclosure, there is a plurality of conflict points. As shown in FIG. 4, the determining a distribution congestion area according to position information of the conflict point includes operations S231 to S232.

In operation S231, cluster analysis is performed on the plurality of conflict points according to position information of each conflict point.

According to an embodiment of the present disclosure, the position information of the conflict points may be analyzed, to calculate a distance between any conflict points and determine a similarity between the calculated distances. If the distances between conflict points meet a predetermined condition, for example, the distances between conflict points are all less than a certain value, the conflict points may be grouped in to a cluster of conflict points having similar distances.

According to an embodiment of the present disclosure, the method of cluster analysis may start from a conflict point to detect other conflict points adjacent to the conflict point in an outward direction, and then identify a congestion edge. Since the sorting vehicle is moving on a grid map, (X, Y), an outermost point of the coordinate point is the edge point of the congestion. For example, it is possible to determine a rectangle of the congestion area, and then determine a left edge point from left side and determine a right edge point from right side.

In operation S232, the distribution congestion area is determined according to a result of the cluster analysis.

According to an embodiment of the present disclosure, an area within which a cluster of conflict points having similar distances are located may be set as the distribution congestion area. One or more distribution congestion areas may be determined according to a result of the cluster analysis, and the number of conflict points in the congestion area may be three or more.

Figure 5:
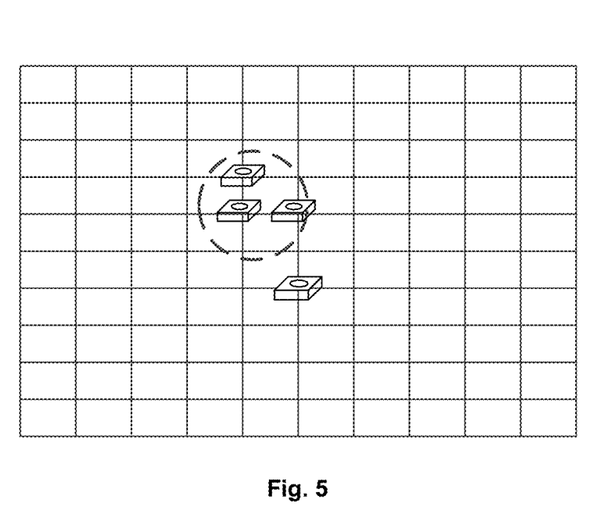
FIG. 5 schematically shows a diagram of a distribution congestion area according to an embodiment of the present disclosure.

FIG. 5 schematically shows a diagram of a distribution congestion area according to an embodiment of the present disclosure.

As shown in FIG. 5, a circular dashed area includes three sorting vehicles, the three sorting vehicles are similar in distance, and a vehicle outside the circular dashed area may be regarded as not in the congestion area.

According to an embodiment of the present disclosure, the conflict points may be adjacent in position and in a distance of a road section. If the number of conflict points exceeds a certain threshold, congestion may be considered to be formed.

According to an embodiment of the present disclosure, by performing cluster analysis on a plurality of conflict points, a distribution congestion area may be determined effectively.

Figure 6:
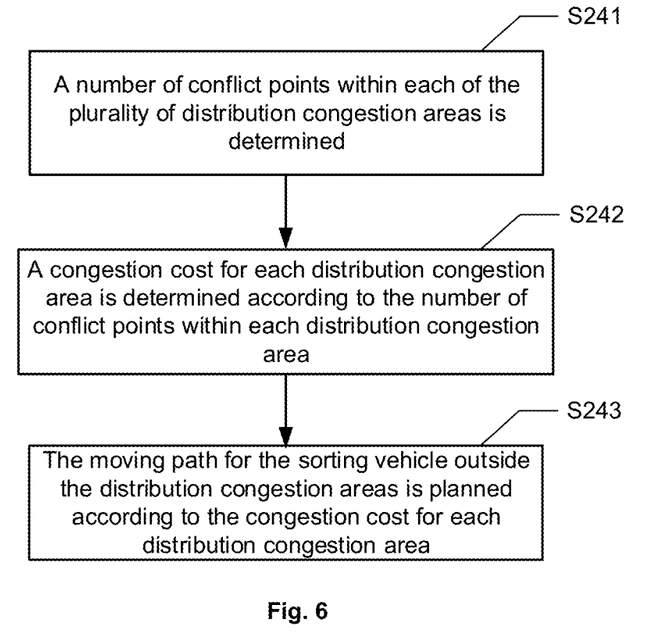
FIG. 6 schematically shows a flowchart of planning a moving path for a sorting vehicle outside a distribution congestion area according to an embodiment of the present disclosure.

FIG. 6 schematically shows a flowchart of planning a moving path for a sorting vehicle outside a distribution congestion area according to an embodiment of the present disclosure.

According to an embodiment of the present disclosure, in a case of a plurality of distribution congestion areas being included, as shown in FIG. 6, the planning a moving path for a sorting vehicle outside the distribution congestion areas includes operations S241 to S243.

In operation S241, a number of conflict points within each of the plurality of distribution congestion areas is determined.

Figure 7:
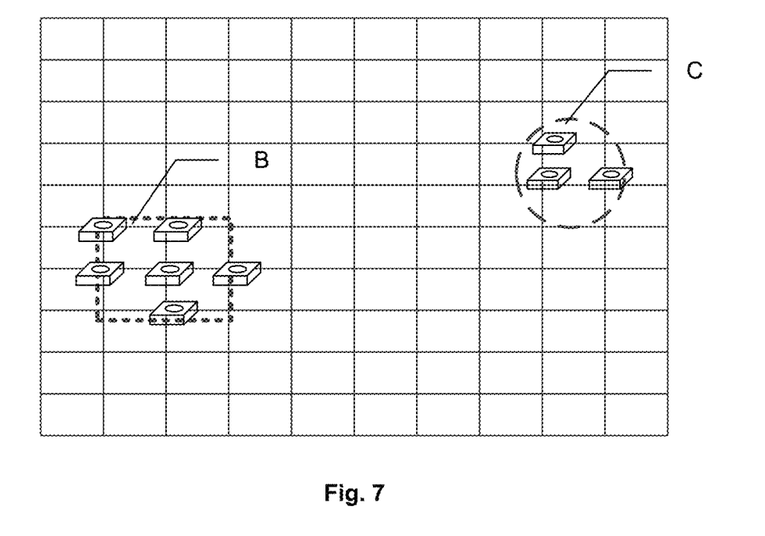
FIG. 7 schematically shows a diagram of a distribution congestion area according to another embodiment of the present disclosure.

For example, FIG. 7 schematically shows a diagram of a distribution congestion area according to another embodiment of the present disclosure.

As shown in FIG. 7, the numbers of conflict points included in the distribution congestion area B is different from that in the distribution congestion area C. The distribution congestion area B includes at least 6 conflict points, and the distribution congestion area C includes at least 3 conflict points.

In operation S242, a congestion cost for each distribution congestion area is determined according to the number of conflict points within each distribution congestion area.

Figure 8:
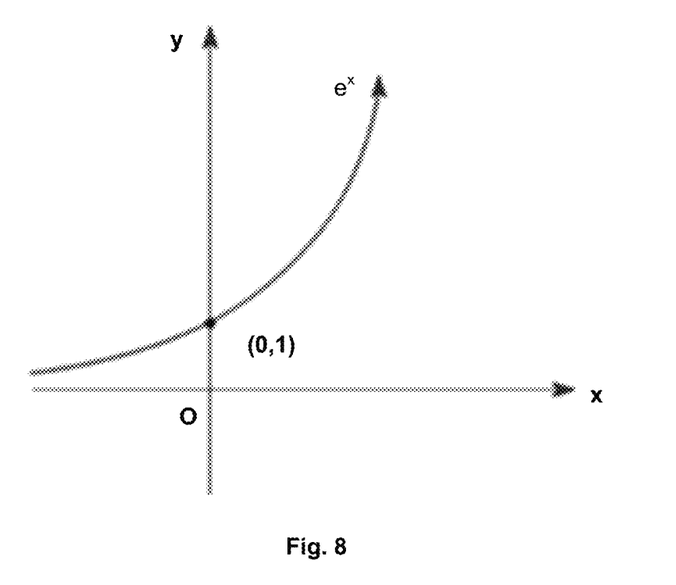
FIG. 8 schematically shows a function diagram for calculating a congestion cost according to an embodiment of the present disclosure.

According to an embodiment of the present disclosure, the congestion cost may be measured by a waiting duration. For example, a congestion cost for 6 conflict points is a waiting time of 20 minutes, and a congestion cost for 3 conflict points is a waiting time of 10 minutes. Determining the congestion cost for each distribution congestion area may further be calculated according to a preset formula. For example, a congestion cost for a congestion area line segment=a cost for a normal path * exp a number of conflict points in the congestion area. For another example, as shown in FIG. 8, congestion cost=$e^x$, wherein x indicates the number of conflict points in the congestion area.

In operation S243, the moving path for the sorting vehicle outside the distribution congestion areas is planned according to the congestion cost for each distribution congestion area.

According to an embodiment of the present disclosure, a congestion cost for each distribution congestion area is determined according to the number of conflict points included in each distribution congestion area. The more the number of conflict points, the higher the congestion cost. In planning a path for a sorting vehicle outside the area according to the cost, it is considered to prevent the sorting vehicle from driving to the congestion areas, such that the increase of the congestion of the sorting vehicles may be mitigated.

Figure 9:
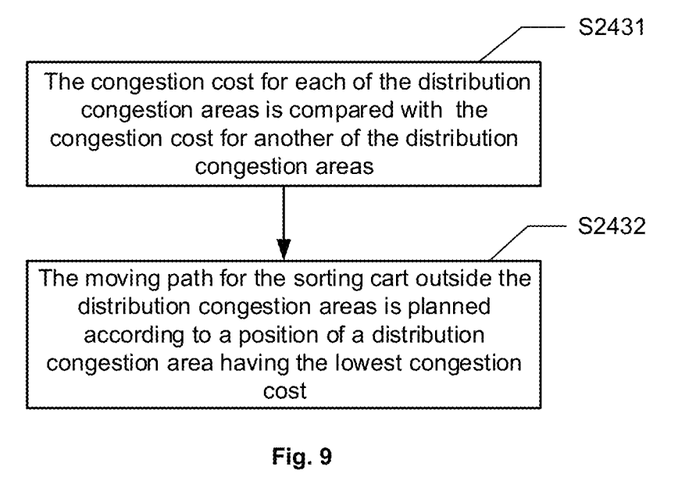
FIG. 9 schematically shows a flowchart of planning a moving path for a sorting vehicle outside a distribution congestion area according to a congestion cost for each distribution congestion area according to an embodiment of the present disclosure.

FIG. 9 schematically shows a flowchart of planning a moving path for a sorting vehicle outside a distribution congestion area according to a congestion cost for each distribution congestion areas according to an embodiment of the present disclosure.

According to an embodiment of the present disclosure, as shown in FIG. 9, planning the moving path for the sorting vehicle outside the distribution congestion areas according to the congestion cost for each distribution congestion area includes operations S2431 to S2432.

In operation S2431, the congestion cost for each of the distribution congestion areas is compared with the congestion cost for another of the distribution congestion areas.

In operation S2432, the moving path for the sorting vehicle outside the distribution congestion area is planned according to a position of a distribution congestion area having the lowest congestion cost.

According to an embodiment of the present disclosure, the number of conflict points included in a distribution congestion area may be different from that in another congestion area, and thus the congestion cost for the distribution congestion area may be different from the congestion cost for said another congestion area. The higher the congestion cost, the more congested the distribution congestion area is, and the lower the congestion cost, the distribution congestion area is relatively smooth. Therefore when planning a moving path for a sorting vehicle outside the distribution congestion area, the congestion cost may be compared between distribution congestion areas, and a path for a remaining path may be determined according to the congestion cost for each distribution congestion area.

According to an embodiment of the present disclosure, by planning a path according to a position of a distribution congestion area having the lowest cost, increasing of vehicle congestion may be reduced and distribution efficiency may be improved.

Figure 10:
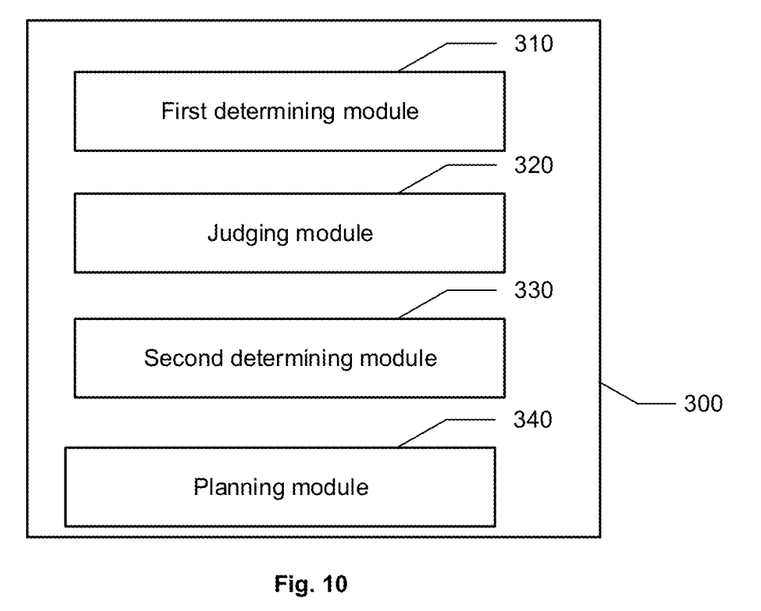
FIG. 10 schematically shows a block diagram of a system for path planning according to an embodiment of the present disclosure.

FIG. 10 schematically shows a block diagram of a system for path planning according to an embodiment of the present disclosure.

As shown in FIG. 10, the system for path planning includes a first determining module 310, a judging module 320, a second determining module 330, and a planning module 340.

The first determining module 310 may determine moving paths for a plurality of sorting vehicles, wherein each sorting vehicle has a corresponding moving path, and each moving path includes one or more navigation points.

The judging module 320 may in a process of each sorting vehicle moving along a corresponding moving path, determine whether the moving paths for the plurality of sorting vehicles have a conflict point, wherein the conflict point is a navigation point causing distribution congestion.

The second determining module 330 may in response to the moving paths for the plurality of sorting vehicles have a conflict point, determine a distribution congestion area according to position information of the conflict point.

The planning module 340 may plan a moving path for a sorting vehicle outside the distribution congestion area.

According to an embodiment of the present disclosure, the planning module 340 may further re-plan a moving path for each sorting vehicle within the distribution congestion area.

According to the embodiments of the present disclosure, by determining whether the moving paths for the plurality of sorting vehicles have a conflict point, determining a distribution congestion area according to position information of a conflict point in response to the moving paths for the plurality of sorting vehicles have the conflict point, and planning a moving path for a sorting vehicle outside the distribution congestion area, it is possible to at least keep the sorting vehicles outside the distribution congestion area away from the congestion area. A moving path of a sorting vehicle may be continuously optimized during moving of the sorting vehicle in practice, and the sorting vehicle may be adaptable to varying working environment. Therefore, it is possible to solve a technical problem of serious congestion in distribution and low distribution efficiency due to difficulty in effectively planning a moving path for a sorting vehicle in related art, and achieve a technical effect of identifying the congestion and prevent the congestion from being increased.

Figure 11:
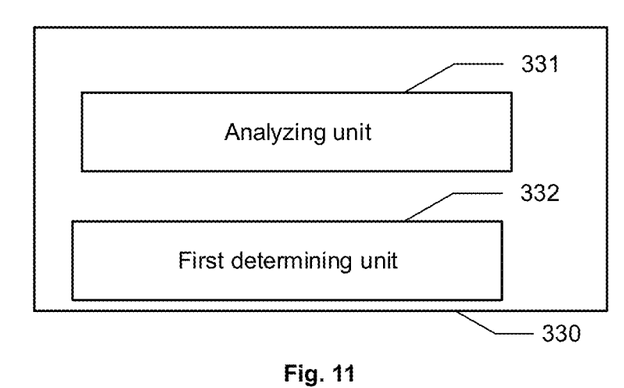
FIG. 11 schematically shows a block diagram of a second determining module according to an embodiment of the present disclosure.

FIG. 11 schematically shows a block diagram of a second determining module according to an embodiment of the present disclosure.

As shown in FIG. 11, according to an embodiment of the present disclosure, the second determining module 330 includes an analyzing unit 331 and a first determining unit 332.

The analyzing unit 331 may perform cluster analysis on the plurality of conflict points according to position information of each conflict point.

The first determining unit 332 may determine the distribution congestion area according to a result of the cluster analysis.

According to an embodiment of the present disclosure, by performing cluster analysis on a plurality of conflict points, a distribution congestion area may be determined effectively.

According to an embodiment of the present disclosure, the first determining unit 332 may determine a plurality of distribution congestion areas according to the result of the cluster analysis.

Figure 12:
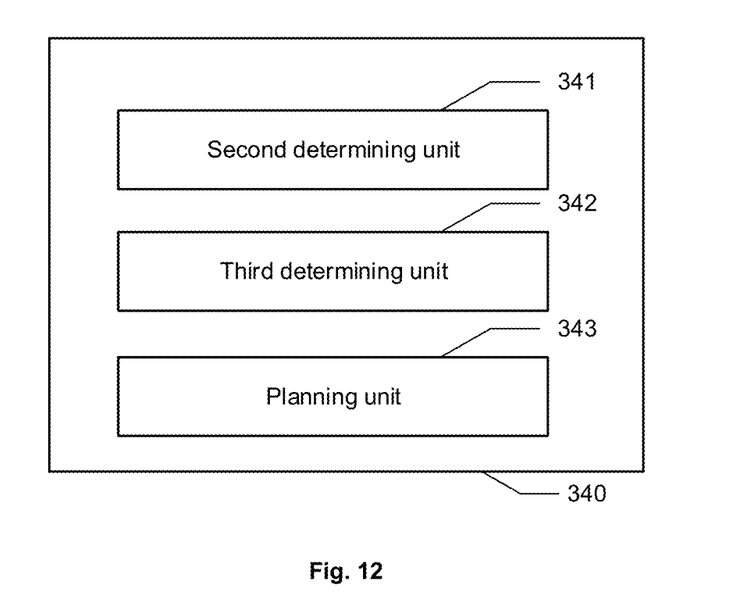
FIG. 12 schematically shows a block diagram of a planning module according to an embodiment of the present disclosure.

FIG. 12 schematically shows a block diagram of a planning module according to an embodiment of the present disclosure.

As shown in FIG. 12, according to an embodiment of the present disclosure, the planning module 340 includes a second determining unit 341, a third determining unit 342, and a planning unit 343.

The second determining unit 341 may in response to a plurality of distribution congestion areas being included, determine a number of conflict points included in each of the plurality of distribution congestion areas.

The third determining unit 342 may determine a congestion cost for each distribution congestion area according to the number of conflict points included in each distribution congestion area.

The planning unit 343 may plan the moving path for the sorting vehicle outside the distribution congestion area according to the congestion cost for each distribution congestion area.

According to an embodiment of the present disclosure, a congestion cost for each distribution congestion area is determined according to the number of conflict points included in each distribution congestion area. The more the number of conflict points, the higher the congestion cost. In planning a path for a sorting vehicle outside the area according to the cost, it is considered to prevent the sorting vehicle from driving to the congestion areas, such that the increase of congestion of the sorting vehicles may be reduced.

Figure 13:
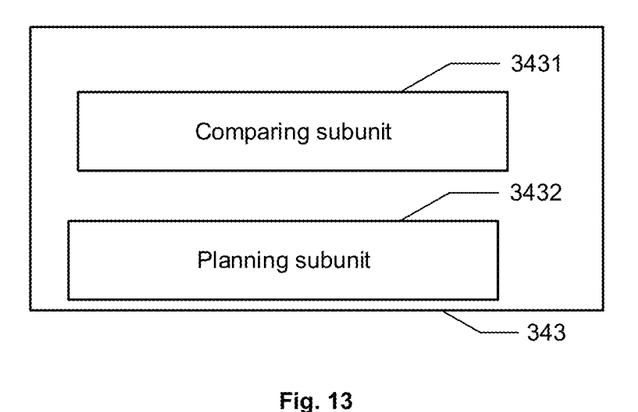
FIG. 13 schematically shows a block diagram of a planning unit according to an embodiment of the present disclosure.

FIG. 13 schematically shows a block diagram of a planning unit according to an embodiment of the present disclosure.

As shown in FIG. 13, according to an embodiment of the present disclosure, the planning unit 343 includes a comparing subunit 3431 and a planning subunit 3432.

The comparing subunit 3431 may compare the congestion cost for each distribution congestion area with the congestion cost for each distribution congestion area.

The planning subunit 3432 may plan the moving path for the sorting vehicle outside the distribution congestion area according to a position of a distribution congestion area having a lowest congestion cost.

According to an embodiment of the present disclosure, by planning a path according to a position of a distribution congestion area having the lowest cost, increase of congestion of vehicles may be reduced and distribution efficiency may be improved.

Any two or more of the modules, sub modules, units and subunits according to the embodiments of the present disclosure, or at least part of the functions thereof may be implemented in one module. Any one or more of the modules, sub modules, units and subunits according to the embodiments of the present disclosure may be split into multiple modules for implementation. Any one or more of the modules, sub modules, units and subunits according to the embodiments of the present disclosure may be implemented at least partially as a hardware circuit, such as a field programmable gate array (FPGA), a programmable logic array (PLA), a system on a chip, a system on a substrate, a system on a package, or an Application Specific Integrated Circuit (ASIC), or may be implemented by hardware or firmware in any other reasonable way that integrates or encapsulates the circuit, or may be implemented by any one of software, hardware and firmware or an appropriate combination thereof. Alternatively, one or more of the modules, sub modules, units and subunits according to the embodiments of the present disclosure may be at least partially implemented as a computer program module that, when executed, performs the corresponding functions.

For example, any two or more of the first determining module 310, the judging module 320, the second determining module 330, the planning module 340, the analyzing unit 331, the first determining unit 332, the second determining unit 341, the third determining unit 342, the planning unit 343, the comparing subunit 3431 and the planning subunit 3432 may be integrated into one module/unit/subunit for implementation, or any one of them may be split into multiple modules/units/subunits. Alternatively, at least part of the functions of one or more of these modules/units/subunits may be combined with at least part of the functions of other modules/units/subunits and implemented in one module/unit/subunit. According to the embodiments of the present disclosure, at least one of the first determining module 310, the judging module 320, the second determining module 330, the planning module 340, the analyzing unit 331, the first determining unit 332, the second determining unit 341, the third determining unit 342, the planning unit 343, the comparing subunit 3431 and the planning subunit 3432 may be may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the first determining module 310, the judging module 320, the second determining module 330, the planning module 340, the analyzing unit 331, the first determining unit 332, the second determining unit 341, the third determining unit 342, the planning unit 343, the comparing subunit 3431 and the planning subunit 3432 may be at least partially implemented as a computer program module that, when executed, performs the corresponding functions.

Figure 14:
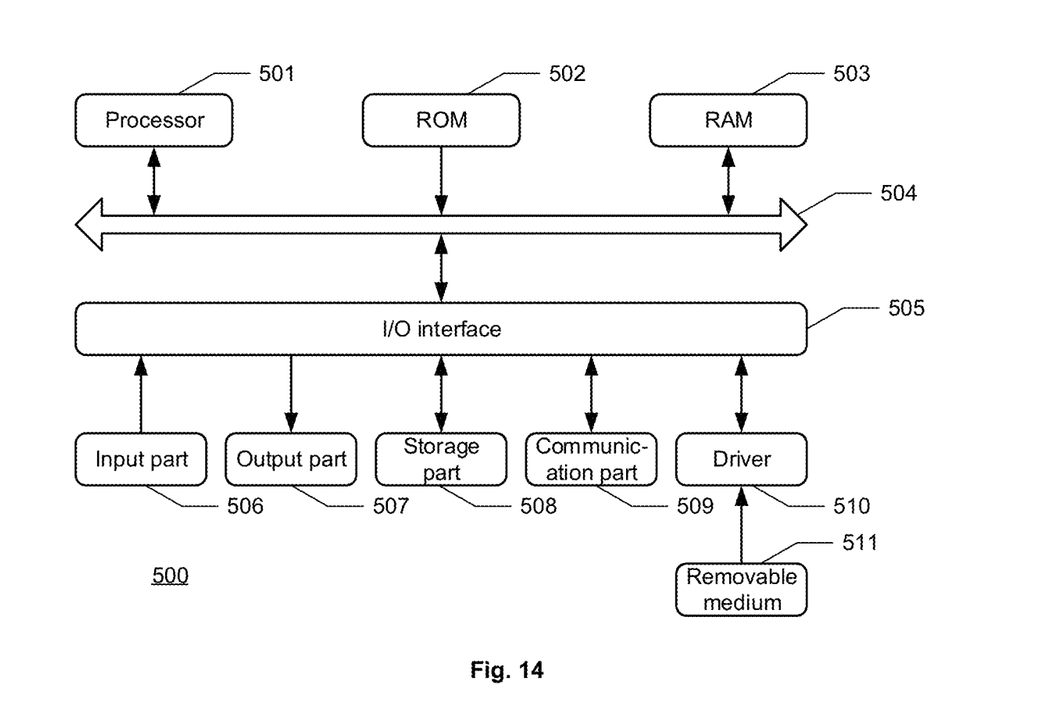
FIG. 14 schematically shows a block diagram of a computer system suitable for implementing the method described above according to an embodiment of the present disclosure.

FIG. 14 schematically shows a block diagram of a computer system suitable for implementing the method described above according to an embodiment of the present disclosure. The computer system shown in FIG. 14 is only an example and should not bring any limitation to the function and scope of use of the embodiments of the present disclosure.

As shown in FIG. 14, a computer system 500 according to the embodiment of the present disclosure includes a processor 501, which may execute various appropriate actions and processing according to the program stored in a read only memory (ROM) 502 or the program loaded into a random access memory (RAM) 503 from a storage part 508. The processor 501 may, for example, include a general-purpose microprocessor (for example, CPU), an instruction set processor and/or a related chipset and/or a special-purpose microprocessor (for example, an application specific integrated circuit (ASIC)), and the like. The processor 501 may also include an on-board memory for caching purposes. The processor 501 may include a single processing unit or multiple processing units for executing different actions of the method flow according to the embodiments of the present disclosure.

Various programs and data required for the operation of the system 500 are stored in the RAM 503. The processor 501, the ROM 502 and the RAM 503 are connected to each other through a bus 504. The processor 501 executes various operations of the method flow according to the embodiments of the present disclosure by executing the programs in the ROM 502 and/or the RAM 503. It should be noted that the program may also be stored in one or more memories other than the ROM 502 and the RAM 503. The processor 501 may also execute various operations of the method flow according to the embodiments of the present disclosure by executing the programs stored in the one or more memories.

According to the embodiment of the present disclosure, the system 500 may further include an input/output (I/O) interface 505 which is also connected to the bus 504. The system 500 may further include one or more of the following components connected to the I/O interface 505: an input part 506 including a keyboard, a mouse, etc.; an output part 507 including a cathode ray tube (CRT), a liquid crystal display (LCD), etc. and a speaker, etc.; a storage part 508 including a hard disk, etc.; and a communication part 509 including a network interface card such as a LAN card, a modem, and the like. The communication part 509 performs communication processing via a network such as the Internet. A drive 510 is also connected to the I/O interface 505 as required. A removable medium 511, such as a magnetic disk, an optical disk, a magneto-optical disk, a semiconductor memory, and the like, is installed on the drive 510 as required, so that the computer program read therefrom is installed into the storage part 508 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication part 509, and/or installed from the removable medium 511. When the computer program is executed by the processor 501, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a non-transitory computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the non-transitory computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the present disclosure, the computer-readable storage medium may be any tangible medium that includes or stores programs that may be used by or in combination with an instruction execution system, apparatus, or device. For example, according to the embodiments of the present disclosure, the computer-readable storage medium may include the above-mentioned ROM 502 and/or RAM 503 and/or one or more memories other than the ROM 502 and RAM 503.

The flowcharts and block diagrams in the drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

We claim:

1. A method for path planning, comprising:
determining moving paths for a plurality of sorting vehicles, wherein each sorting vehicle corresponds to one of the moving paths, and each moving path comprises one or more navigation points;
in a process of each sorting vehicle moving along a corresponding moving path, determining whether the moving paths for the plurality of sorting vehicles having a conflict point, wherein the conflict point is a navigation point causing distribution congestion;
in response to the moving paths for the plurality of sorting vehicles having a conflict point, determining a distribution congestion area according to position information of the conflict point; and
planning a moving path for a sorting vehicle outside the distribution congestion area,
wherein the moving paths for the plurality of sorting vehicles having a plurality of conflict points, and wherein the determining a distribution congestion area according to position information of the conflict point comprises:
performing cluster analysis on the plurality of conflict points according to position information of each conflict point; and
determining the distribution congestion area according to a result of the cluster analysis,
wherein the performing cluster analysis on the plurality of conflict points according to position information of each conflict point comprises:
calculating distances between the plurality of conflict points according to the position information of each conflict point; and
grouping any two of the plurality of conflict points into a cluster if the distance between the two of the plurality of conflict points falls within a predetermined range.

2. The method of claim 1, wherein:
the determining the distribution congestion area according to a result of the cluster analysis comprises: determining a plurality of distribution congestion areas according to the result of the cluster analysis;

in response to a plurality of distribution congestion areas are determined, the planning a moving path for a sorting vehicle outside the distribution congestion area comprises:
- determining a number of conflict points within each of the plurality of distribution congestion areas;
- determining a congestion cost for each distribution congestion area according to the number of conflict points within said each distribution congestion area; and
- planning the moving path for the sorting vehicle outside the distribution congestion areas according to the congestion cost for each distribution congestion area.

3. The method of claim 2, wherein the planning the moving path for the sorting vehicle outside the distribution congestion areas according to the congestion cost for each distribution congestion area comprises:
- comparing the congestion cost for each of the distribution congestion areas with the congestion cost for another of the distribution congestion areas; and
- planning the moving path for the sorting vehicle outside the distribution congestion areas according to a position of a distribution congestion area having the lowest congestion cost.

4. A computer system, comprising:
- one or more processors; and
- a memory, configured to store one or more programs which, when executed by the one or more processors, cause the one or more processors to implement the method for path planning of claim 3.

5. A computer-readable storage medium having executable instructions stored thereon which, when executed by a processor, cause the processor to implement the method for path planning of claim 3.

6. A computer system, comprising:
- one or more processors; and
- a memory, configured to store one or more programs which, when executed by the one or more processors, cause the one or more processors to implement the method for path planning of claim 2.

7. A computer-readable storage medium having executable instructions stored thereon which, when executed by a processor, cause the processor to implement the method for path planning of claim 2.

8. The method of claim 1, further comprising:
- re-planning a moving path for each sorting vehicle within the distribution congestion area.

9. A computer system, comprising:
- one or more processors; and
- a memory, configured to store one or more programs which, when executed by the one or more processors, cause the one or more processors to implement the method for path planning of claim 8.

10. A computer-readable storage medium having executable instructions stored thereon which, when executed by a processor, cause the processor to implement the method for path planning of claim 8.

11. A computer system, comprising:
- one or more processors; and
- a memory, configured to store one or more programs which, when executed by the one or more processors, cause the one or more processors to implement the method for path planning of claim 1.

12. A computer-readable storage medium having executable instructions stored thereon which, when executed by a processor, cause the processor to implement the method for path planning of claim 1.

13. A computer system, comprising:
- one or more processors; and
- a memory, configured to store one or more programs which, when executed by the one or more processors, cause the one or more processors to implement the method for path planning of claim 1.

14. A computer-readable storage medium having executable instructions stored thereon which, when executed by a processor, cause the processor to implement the method for path planning of claim 1.

* * * * *